US012563035B2

(12) United States Patent
Morgan

(10) Patent No.: US 12,563,035 B2
(45) Date of Patent: Feb. 24, 2026

(54) METHOD AND SYSTEM FOR ACCESS AUTHORISATION

(71) Applicant: Sage Global Services Limited, Tyne and Wear (GB)

(72) Inventor: Richard Morgan, Tyne and Wear (GB)

(73) Assignee: Sage Global Services Limited, Newcastle Upon Tyne (GB)

( * ) Notice: Subject to any disclaimer, the term of this patent is extended or adjusted under 35 U.S.C. 154(b) by 384 days.

(21) Appl. No.: 17/894,000

(22) Filed: Aug. 23, 2022

(65) Prior Publication Data

US 2023/0068283 A1     Mar. 2, 2023

(30) Foreign Application Priority Data

Aug. 26, 2021     (EP) ..................................... 21193305

(51) Int. Cl.
*H04L 9/40*          (2022.01)
*G06F 21/60*          (2013.01)
(52) U.S. Cl.
CPC ........ *H04L 63/0853* (2013.01); *G06F 21/604* (2013.01); *H04L 63/0861* (2013.01)

(58) Field of Classification Search
CPC ............. H04L 63/0853; H04L 63/0861; H04L 9/3215; H04L 9/3234; H04L 63/0807;
(Continued)

(56) References Cited

U.S. PATENT DOCUMENTS 10,692,138 B1 *   6/2020   Nguyen ................ H04L 63/102
2005/0184145 A1 *   8/2005   Law ................... G06Q 20/4012
235/380

(Continued)

OTHER PUBLICATIONS

Extended European Search Report dated Jan. 31, 2022, in connection with European Application No. 21193305.6.

(Continued)

*Primary Examiner* — Tan Doan
(74) *Attorney, Agent, or Firm* — Wolf, Greenfield & Sacks, P.C.

(57)     ABSTRACT
The present invention relates to authorising access to data (132) associated with a user. Aspects of the invention provide a computer-implemented method, computer software, a system and a computing device. The method comprises receiving, at an application server (120) from a first device (110), a request to access the data (132) associated with the user. The data (132) is hosted at a data server (130) external to the application server (120). The application (Continued)

server (120) provides an authorisation request (510) to an authorisation server (140); and the authorisation request is transmitted from the authorisation server (140) to an authorisation application (310) executed on a second device (150) associated with the user. The authorisation application (310) executed on the second device (150) sends, in response to receiving the authorisation request, a redirect authorisation request (520) to a second application (320) executed on the second device (150), the second application (320) being associated with the data server (130). The request is authorised at the second device (150) by the second application (320), in dependence on an authorisation input from the user at the second device (150). In response to the authorisation of the request the second application (320) provides an access token to the application server (120) via the authorisation server (140), the access token being configured to enable access by the application server (120) to the data associated with the user.

13 Claims, 6 Drawing Sheets

(58) Field of Classification Search
CPC ....... H04L 63/18; G06F 21/604; G06F 21/32; G06F 21/35; G06F 21/43; G06F 21/42; H04W 12/084
USPC ............................................................ 726/4
See application file for complete search history.

(56) References Cited

U.S. PATENT DOCUMENTS

| | | | |
|---|---|---|---|
| 2014/0007195 A1* | 1/2014 | Gupta | ................. H04L 63/0876 |
| | | | 726/4 |
| 2019/0068376 A1* | 2/2019 | Kong | .................... H04L 9/3231 |
| 2019/0245909 A1 | 8/2019 | Forrest | |
| 2020/0220864 A1* | 7/2020 | Goodsitt | ............... H04L 9/3228 |

OTHER PUBLICATIONS

Fernandez et al., OpenID Connect Client Initiated Backchannel Authentication Flow-Core 1.0 draft-03. OpenID.Net. Jan. 22, 2020. 27 pages. https://openid.net/specs/openid-client-initiated-backchannel-authentication-core-1_2-ID2.html [Retrieved Jan. 1, 2022].

Kawasaki, CIBA, explained by an implementer. Medium.com. Jan. 9, 2019. 27 pages. https://darurk.medium.com/ciba-new-authentication-anthorizatoin-technology-in-2019-explained-by-an-implementer-die0ac1311b4 [Retrieved Jan. 1, 2022].

Kawaski, Diagrams and Movies Of All The OAuth 2.0 Flows. Medium.com. May 26, 2017. 10 pages. https://darutk.medium.com/diagrams-and-movies-of-all-the-oauth-2-0-flows-194f3c3ade85 [Retrieved Apr. 23, 2020].

Vinushanth, Client-Initiated Back-channel Authentication [CIBA] Support for WSO2 Identity Server #6835. Github. Nov. 8, 2019. 8 pages. https://github.com/wso2/product-is/issues/6835 [Retrieved Jan. 20, 2022].

* cited by examiner

METHOD AND SYSTEM FOR ACCESS AUTHORISATION

RELATED APPLICATIONS

Foreign priority benefits are claimed under 35 U.S.C. § 119 (a)-(d) or 35 U.S.C. § 365(b) of European application number 21193305.6, filed Aug. 26, 2021, the entirety of which is incorporated herein by reference.

The present invention relates to methods and systems for access authorisation and particularly to authorising access to data. Aspects of the invention relate to methods for authorising access to data, to computer software, to a system for authorising access to data, and to a computing device.

BACKGROUND

Web or cloud applications are typically accessed via the internet. At least part of the application is provided by an application server, typically a remote server, rather than locally on a client device. Increasingly, providers of web applications require access to externally hosted data which is not hosted by the application server. For example, a health application may require access to medical records or other sensitive data hosted externally. In other scenarios, in the case of a web application for managing client accounts, the application may need to access and assimilate data hosted by a number of third party providers such as banks, building societies and the like. Such data will be hosted by third party providers and will be associated with a data owner.

The externally hosted data can be sensitive in nature, and thus for the third party provider to provide the data to the application server following a request from the client, authorisation is required from the data owner.

It can be preferable for the user to perform the authorisation steps on a separate device from that accessing the web application. For example, in some cases the data owner and the entity requesting authorisation may be different people. Furthermore, authorising on a mobile device, e.g. using biometric factors, can be less burdensome for the user. For example, hardware of the mobile device may support biometric authorisation, such as by facilitating one touch authorisation. An authorisation flow wherein the authorisation is performed on a different device to the device sending the request may be referred to as a decoupled flow. However, the type of authorisation flow available is reliant on the third party provider from whom the data has been requested supporting that flow. Commonly, third party providers may not support decoupled authorisation flows, and may only support redirect authorisation flows within the same device i.e. between two applications executing on the same device, which can be burdensome for the user.

It is an aim of the present invention to address one or more of the disadvantages associated with the prior art.

BRIEF SUMMARY OF THE DISCLOSURE

Aspects of the present inventions relate to a computer-implemented method, to computer software, to a system and to a computing device for authorising access to data associated with a user.

In accordance with a first aspect there is provided a computer-implemented method for authorising access to data associated with a user, comprising: receiving, at an application server from a first device, a request to access the data associated with the user, the data being hosted at a data server; providing, by the application server, an authorisation request to an authorisation server; transmitting the authorisation request from the authorisation server to an authorisation application executed on a second device associated with the user; and sending, by the authorisation application executed on the second device in response to receiving the authorisation request, a redirect authorisation request to a second application executed on the second device, the second application being associated with the data server; authorising, at the second device by the second application, the request in dependence on an authorisation input from the user at the second device; and in response to the authorisation of the request, providing, by the second application, an access token to the application server via the authorisation server, the access token being configured to enable access by the application server to the data associated with the user.

Advantageously, the present invention facilitates decoupled authorisation (i.e. authorising the request on a different device to the first device). The provision of an authorisation server and authorisation application on the second device enables such decoupled authorisation to be implemented regardless of whether the data server (i.e. authoriser) supports a decoupled authorisation flow.

The user may be referred to as a data owner of the data. The first device may be associated with the data owner or with a different user, i.e. the request may originate from a user who is not the data owner. The data owner may wish to authorise the request or prevent the user of the first device (the requester) from accessing the data. The second device may be a mobile device.

The method may comprise displaying, at a display of the second device through the authorisation application, information indicative of the data requested; receiving, at the second device, a user input; and sending the redirect authorisation request in dependence on the user input. The user input may be indicative of a selection of a subset of the data requested; and sending the redirect authorisation request may comprise selectively requesting the subset of data selected.

Optionally, the access token is provided by the second application to the authorisation server via the authorisation application. Alternatively, providing the access token may comprise providing, by the second application, an authorisation code to the authorisation server via the authorisation application; and retrieving, by the authorisation server, the access token from the data server using the authorisation code.

The method may further comprise authenticating, at the second device by the second application, the user of the second device, wherein the authorising is further in response to successful authentication of the user. Authenticating the user may comprise: obtaining user data associated with the user at the second device, comparing the user data to predetermined authentication data, and authenticating the user in dependence on the comparison. For example, the user data may be a password, or may comprise biometric data. The user data may comprise an indication of one or more biometric measurements taken of the user through the second device. Optionally, the user data may comprise one or more of: fingerprint data received from a fingerprint sensor associated with the second device, image data of the user received from an image sensor associated with the second device, or voice data of the user received from an audio sensor associated with the second device.

According to another aspect there is provided software which, when executed, is arranged to perform a method as described above.

According to another aspect there is provided a system for authorising access to data associated with a user and hosted at a data server, the system comprising: an application server configured to receive, from a first device, a request to access the data associated with the user and transmit an authorisation request associated with the request to an authorisation server; an authorisation server configured to receive the authorisation request from the application server; and a second device associated with the user configured to execute an authorisation application and a second application associated with the data server; wherein the authorisation server is configured to: transmit the authorisation request to the authorisation application executed on the second device; and wherein the second device is configured to: send, by the authorisation application in response to receiving the authorisation request, a redirect authorisation request to the second application; authorise, by the second application, the request in dependence on an authorisation input from the user at the second device; and in response to the authorisation, provide, by the second application, an access token to the application server via the authorisation server, the access token being configured to enable access by the application server to the data associated with the user.

According to another aspect there is provided a computing device for authorising access to data associated with a user and hosted at a data server, the device comprising: one or more processors; and a memory storing computer executable instructions therein which, when executed by the one or more processors, cause the one or more processors to: execute an authorisation application; execute a second application associated with a data server hosting the data associated with the user; receive, through the authorisation application, an authorisation request from an authorisation server, wherein the authorisation request is indicative of a request by an application server to access the data associated with the user; send, by the authorisation application in response to receiving the authorisation request, a redirect authorisation request to the second application; authorise, by the second application, the request in dependence on an authorisation input from the user; and in response to the authorisation, transmit, by the second application, an access token to the application server via the authorisation server, the access token being configured to enable access by the application server to the data associated with the user. The computing device may be a mobile device.

BRIEF DESCRIPTION OF THE DRAWINGS

Embodiments of the invention are further described hereinafter with reference to the accompanying drawings, in which.

DETAILED DESCRIPTION

Figure 1:
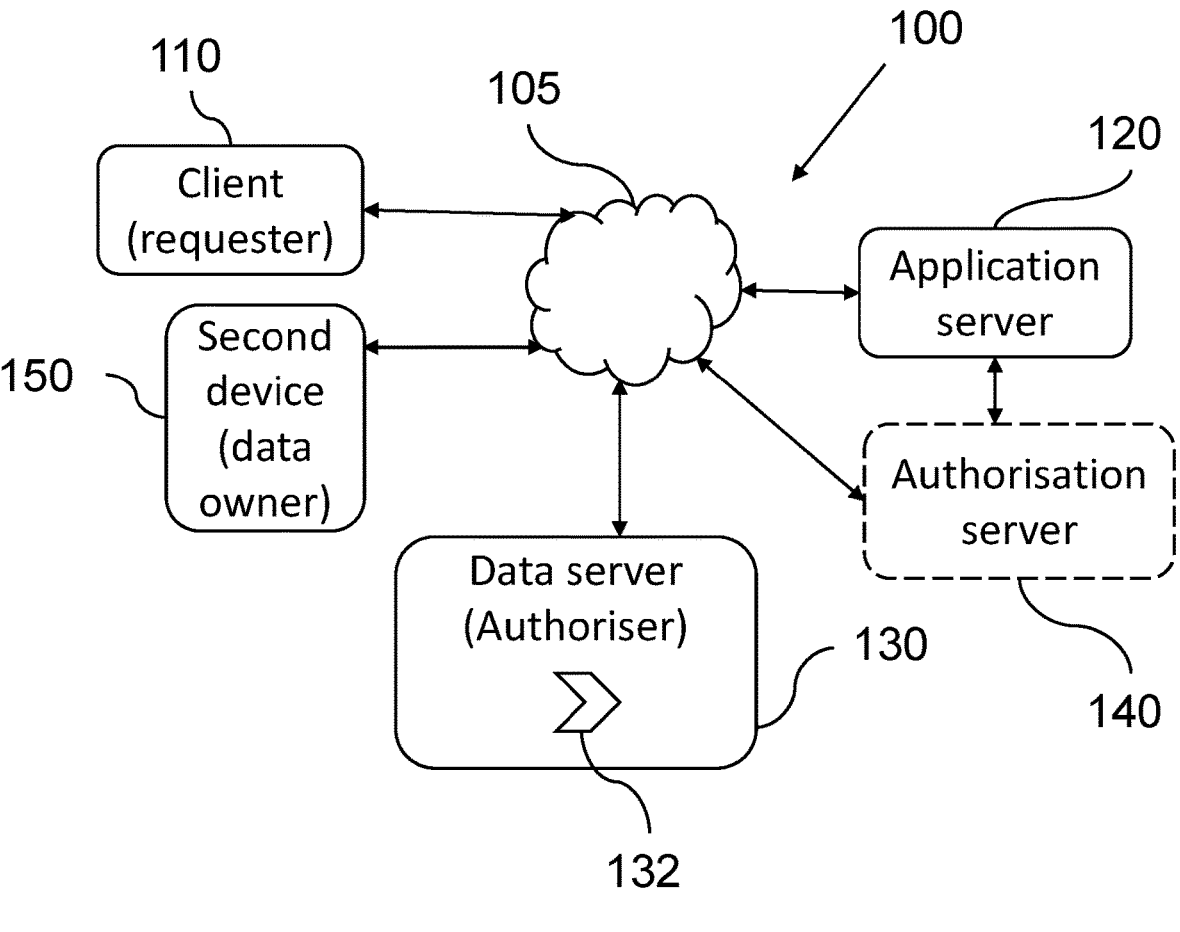
FIG. 1 shows a block diagram of a system for authorising access to data.

Referring to FIG. 1, there is shown a block diagram of a system, indicated generally by the reference numeral 100, for authorising access to data associated with a data owner. The system 100 comprises a client device 110 and an application server 120. The client device 110 and the application server 120 are adapted to communicate with one another via the internet 105 or another suitable computer network. The application server 120 is configured to execute a web application accessed by the client device 110 through a web browser application and to return data to the client device 110.

The client device 110, using the web browser application, may request to access data 132 associated with the data owner through the web application hosted on the application server 120. The client device 110 may henceforth be referred to as the requester. The data 132 is hosted by a third party service provider at a data server 130 external to the application server 120. For example, the client device 110 may request to import banking feed data to the web application, wherein the banking feed data is hosted at a data server 130 associated with a banking provider. However, the present invention may be applicable to any type of data hosted externally to the application server 120, such as personal data, medical data or the like. The data 132 may be sensitive data associated with the data owner. Thus, the data server 130 may require authorisation from the data owner in order to provide the data 132 to the application server 120. As the third party service provider hosts the data 132 the third party service provider will typically be responsible for obtaining such authorisation. Herein, the third party service provider hosting the data 132 may thus be referred to as the authoriser.

Conventionally, the application server redirects the requester associated with the client device 110 to a URL associated with the data server 130, and the requester is authenticated and authorised according to a flow determined by the authoriser. Once the requester is authorised, the application server 120 is provided with an access token by the authoriser, e.g. via the data server 130, to facilitate retrieval of the data 132 from the data server 130. Such an authorisation flow wherein the requester is redirected on the client device 110 to perform authentication and authorisation may be referred to as redirect authorisation. Example redirect authorisation protocols include, for example industry standard protocol OAuth 2.0, OpenID, or SAML 2.0 redirect binding.

According to the present invention, the system 100 comprises a second device 150 associated with the data owner. It can be preferable for the data owner to complete the authorisation on the second device 150, for example if the requester and the data owner are different individuals and thus geographically separated, or if the second device 150 is a mobile device which facilitates the use of biometric factors to authenticate the data owner and authorise the request, reducing the burden placed on the data owner. Conventionally, the option of completing the authorisation on the second device 150 would only be available if the authoriser supports decoupled authorisation. Decoupled authorisation refers to any authorisation protocol which facilitates the request originating from a different device to the device on which the authorisation is performed. An example of decoupled authorisation is Client-Initiated Backchannel Authentication (CIBA) such as Open ID Connect (OIDC) CIBA profile. However, frequently authorisers only support a redirect authorisation flow, resulting in inconsistency and increased burden for data owners. Advantageously, embodiments of the present invention provide a mechanism by which the data owner may authorise all requests deriving from the application server 120 on the chosen second device 150, even if the authoriser does not support decoupled authorisation.

To solve the above problem, the system 100 comprises an authorisation server 140 communicably coupled to the application server 120. The authorisation server 140 may be integrated with the application server 120 in some embodiments, or the authorisation server 140 and the application server 120 may be configured to communicate over one or more networks such as the Internet 105 or local network. According to the present invention, the application server 120 is configured to transmit an authorisation request for the data 132 to the authorisation server 140. The authorisation request is a decoupled authorisation request, e.g. according to CIBA in some embodiments. The authorisation server 140 is adapted in conjunction with the second device 150 to facilitate enabling the data owner to authorise the request on the second device 150 irrespective of whether the third party service provider supports decoupled authorisation, as will be explained with reference to the subsequent Figures.

Figure 2:
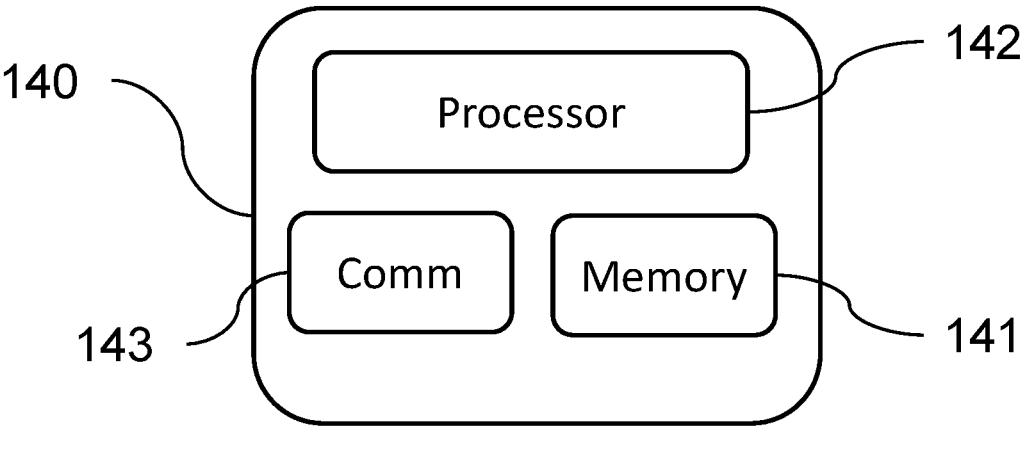
FIG. 2 shows a block diagram of an authorisation server.

Referring to FIG. 2, there is shown a block diagram of the authorisation server 140. The authorisation server 140 comprises a memory device 141, a processor 142 and a communication module 143. The authorisation server 140 is adapted to receive, through the communication module 143, the decoupled authorisation request. The authorisation server 140 is then configured to determine an ID of the second device 150 associated with the data owner in dependence on the decoupled authorisation request. The decoupled authorisation request thus comprises a user ID associated with the data owner, such as a user ID identifying the data owner at the application server 120. The user ID may for example be an ID number, an e-mail address or the like. The authorisation server 140 is then configured to map the user ID of the decoupled authorisation request to an ID of the second device 150. The ID of the second device 150 associated with each user ID may be stored at or accessible by the authorisation server 140, e.g. during configuration of the system by the data owner. The decoupled authorisation request is then pushed by the communication module 143 to the second device 150.

Figure 3:
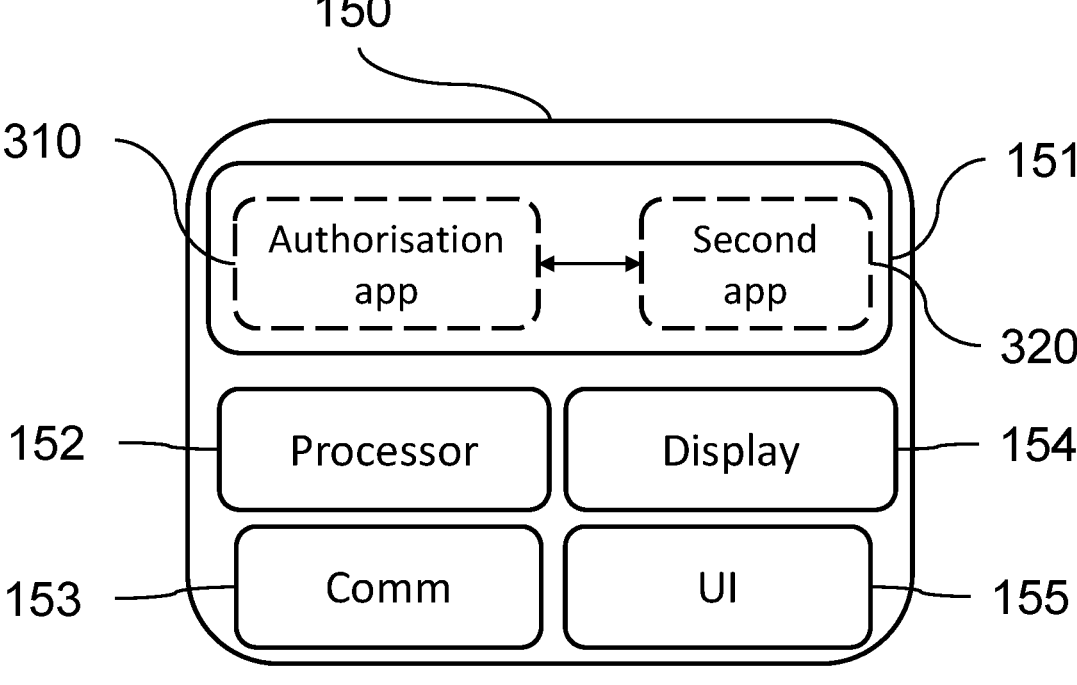
FIG. 3 shows a block diagram of a second computing device.

Referring to FIG. 3, there is shown a block diagram of the second device 150. The second device 150 may be a mobile device. The second device 150 may be any personal communication device such as a mobile phone, a tablet device or the like; a personal computing device such as a tablet Personal Computer (PC), desktop PC, a laptop computer, or the like; and/or other electronic devices such as a Portable Multimedia Player (PMP), a mobile medical device, a camera, or a wearable device such as a smart watch or smart glasses.

The second device 150 comprises a memory device 151, a processor 152 and a communication module 153. In some embodiments, the second device 150 comprises a display 154 for providing an output to a user of the second device 150 and one or more user interfaces (UIs) 155 for receiving input from a user of the second device 150. The UI 155 may comprise for example a keypad or touchscreen and may optionally be integrated with the display 154. In some embodiments, the UI 155 may comprise one or more sensors for collecting biometric data associated with the user, such as an image sensor, fingerprint sensor, retinal scanner or the like.

The second device 150 is configured to execute an authorisation application 310 and a second application 320, wherein the second application 320 is associated with the authoriser, i.e. the third party service provider hosting the data server 130. For example, the second application may be a banking application associated with a bank storing the data 132. The authorisation application 310 and the second application 320 are each native applications installed on the second device 150 in an embodiment. Alternatively, the authorisation application 310 and the second application 320 may be web applications or cloud applications at least partially executing on a server external to the second device 150. The web application or cloud application may then be executed through a browser application of the second device 150. However, if the authorisation application 310 and second application 320 are not native, some functionality of the second device (such as the one or more sensors) may not be accessible to the authorisation application 310 and second application 320, which may limit the manner by which the user is authenticated.

The authorisation application 310 is associated with the authorisation server 140. The authorisation server 140 is configured to push the decoupled authorisation request to the authorisation application 310 on the second device 150. The authorisation application 310 is configured to convert the decoupled authorisation request to a redirect authorisation request. That is, in response to the decoupled authorisation request being pushed to the authorisation application 310 on the second device 150, the authorisation application 310 is configured to determine a redirect authorisation request, e.g. using OAuth 2.0, and transmit the redirect authorisation request to the second application 320. The second application 320 may thus authenticate and authorise the user of the second device 150 according to any predefined flow by the authoriser, e.g. using biometric authorisation. Once the request has been authorised through the second application 320, the second application 320 may provide an access token to the application server 120 via the authorisation application 310 and the authorisation server 140. The access token enables the application server 120 to retrieve the data 132 from the data server 130.

In this way, decoupled authorisation can be provided even when the third party service provider only supports redirect authorisation. By providing the authorisation server 140 and the authorisation application 310 on the second device 150, a decoupled authorisation request can be readily converted into a redirect authorisation request at the second device 150 for communicating with the authoriser, i.e. the third party service provider hosting the data server 130.

Figure 4:
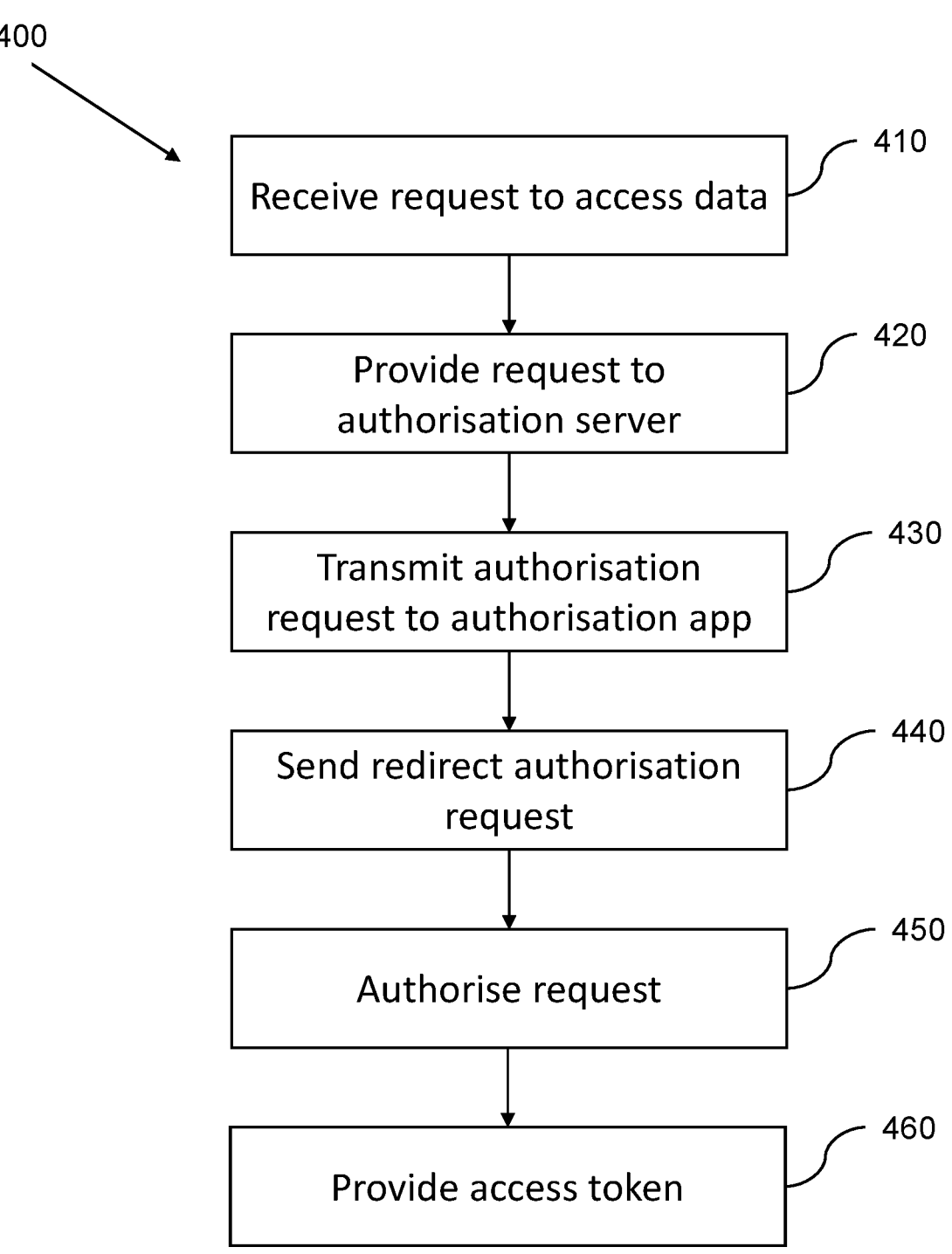
FIG. 4 shows a flow chart of a method 400.

Referring to FIG. 4, there is shown a flow chart of a method 400 for authorising access to the data 132 associated with the data owner.

The method 400 comprises a step 410 of receiving a request to access the data 132. The request is received at the application server 120 from a client device 110. The user of the client device 110 may be referred to as the requester. The requester may be the data owner of the data 132, however in other situations the requester may be a different entity to the data owner, e.g. a third party medical professional or accountant who requires access to the data 132 associated with the data owner. The data owner may wish to approve or deny access to the data 132 by the requester. An application, such as a web application, executing at the application server 120 may be accessed by the requester via a browser application on the client device 110. The requester may request to utilise the data 132 at the application server 120, such to import the data 132 to the web application, e.g. to import a bank feed associated with the data owner. The data 132 may be sensitive data associated with the data owner hosted at the data server 130. The authoriser, i.e. the third party service provider hosting the data server 130, may be responsible for obtaining authorisation from the data owner of the data 132 to release the data 132, as explained.

The method 400 comprises a step 420 of providing, by the application server 120, an authorisation request. The authorisation request is determined according to a decoupled authorisation protocol such as CIBA and is provided i.e. communicated to the authorisation server 140. Notably, the request may always be provided to the authorisation server 140 regardless of the identity of the authoriser. This can be notable as the application server 120 may assimilate data from many different third party service providers, and thus requests may be made to a plurality of authorisers.

The method 400 comprises a step 430 of transmitting the authorisation request to the second device 150. Step 430 may comprise determining, by the authorisation server, an ID of the second device 150 associated with the data owner in dependence on the authorisation request. For example, the authorisation request may include an ID associated with the data owner, and the authorisation server 140 may be configured to determine the associated ID of the second device 150 corresponding to the data owner ID. The authorisation server 140 is communicably coupled to the second device 150 through the authorisation application 310 preconfigured by the data owner at the second device 150. Step 430 may thus comprise pushing the authorisation request from the authorisation server 140 to the authorisation application 310 executing on the second device 150.

The authorisation request may then be converted into a redirect authorisation request by the authorisation application at the second device 150. Importantly, authorisers commonly support redirect authorisation such as OAuth 2.0, though less frequently support decoupled authorisation such as CIBA, as discussed. Thus, the redirect authorisation request will provide a communication channel between the authorisation application 310 and the second application 320 associated with the authoriser. In step 440, the authorisation application 310 sends a redirect authorisation request, such as according to OAuth 2.0, in response to receiving the (decoupled) authorisation request from the authorisation server 140. At this point, the identity of the authoriser becomes relevant. The second device 150 is arranged to execute a second application associated with the authoriser. In the case of multiple authorisers being possible, the authorisation application 310 may be preconfigured to identify a respective application associated with each potential authoriser, as will be described with reference to FIG. 8. The authorisation request received in step 430 comprises an indication of the authoriser. Thus, the authorisation application 310 sends the redirect authorisation request to the specific second application 320 executed on the second device 150 which is associated with the indicated authoriser.

In some embodiments, step 440 may comprise a sub-step of requesting approval from the user of the second device 150 that the authentication request should be provided to the second application 320. The authorisation application 310 may display via the display 154 an indication of the data 132 requested and the client 110 requesting access. The user of the second device 150, i.e. the data owner, may then determine whether they recognise the request and wish to approve it. If the request is recognised and acceptable to the user, they may provide a user input via the UI 155 approving the forwarding of the request. The redirect authorisation request may then be sent to the second application 320 in response to the user input confirming that the request is acceptable. By requiring a confirmation of the request at the authorisation application 310, an extra layer of security is provided independent of the authoriser.

In some examples, the user input may comprise a selection of a subset of the data 132 requested, as the user may only wish to provide a subset of the requested data 132 to the client 110. The user may thus select the relevant subset of data 132 displayed on the display 154. Step 440 may thus comprise sending a redirect authorisation request to the second application 320 selectively requesting authorisation for the subset of data 132 indicated by the user.

The method 400 comprises a step 450 of authorising the request by the second application 320. The authorising may be defined according to the authoriser's requirements. An authorisation input may be received from the user through the UI 155, and the request may be authorised in dependence on receiving such an authorisation input. The authorisation input is indicative of the data owner approving the request.

Step 450 may comprise authenticating the user of the second device 150 prior to authorising the request, i.e. confirming that the user is the data owner. Authentication may be performed prior to authorisation to ensure the user of the second device 150 is the data owner and thus authorised to allow the request. The authorisation of step 450 may only be performed in response to successful authentication of the user.

Authentication data associated with the authorised data owner may be stored in a location accessible to the second application 320, e.g. on the data server 130 or on the second device 150. The authentication data may be predefined during configuration of the third party service by the data owner.

Step 450 may comprise obtaining user data associated with the user at the second device 150, comparing the user data to the authentication data, and authenticating the user if the user data matches the authentication data. In some embodiments, the authentication data may comprise a predefined password and the user may input user data in the form of a password at the UI 155. Alternatively, or additionally, the user data may comprise biometric data. One or more biometric measurements of the user may be taken through the second device 150 e.g. by sensors associated with the UI 155 such as an image sensor, a microphone or a fingerprint sensor. For example, the biometric data may comprise fingerprint data, image data, or voice data. By comparing the biometric data captured at the second device 150 with predefined authentication data associated with the authorised user captured during a configuration of the second application 320, additional security is provided. Each aspect of the user data may be referred to as a respective authentication factor. Possession of the second device 150 may also be considered an authentication factor. Each additional authentication factor utilised in the authentication improves the security of the authentication and reduces the likelihood of an unauthorised person gaining access to the data 132.

The method 400 comprises a step 460 of providing an access token in response to successful authorisation. The access token is arranged to enable access by the application server 120 to the data 132. In step 460, the access token is provided to the application server 120 via the authorisation server 140. In some embodiments, the access token may be provided directly by the second application 320 to the authorisation application 310. The authorisation application 310 is then configured to forward the token to the authorisation server 140 which provides the access token to the application server 120 for retrieving the data 132.

In other examples, the second application 320 may provide an authorisation code to the authorisation application 310. The authorisation application 310 may then provide the authorisation code, or an authorisation code derived therefrom, to the authorisation server 140. The authorisation sever 140 can then exchange the authorisation code for the access token with the data server 130. Utilising the authorisation code can provide an extra layer of security, as during the exchange the data server 130 may request further credentials from the authorisation server 140 before releasing the access token. Thus, the access token is less freely distributed and the data server 130 can have a higher degree of confidence that the access token is being provided to the correct entity authorised by the data owner.

Figure 5:
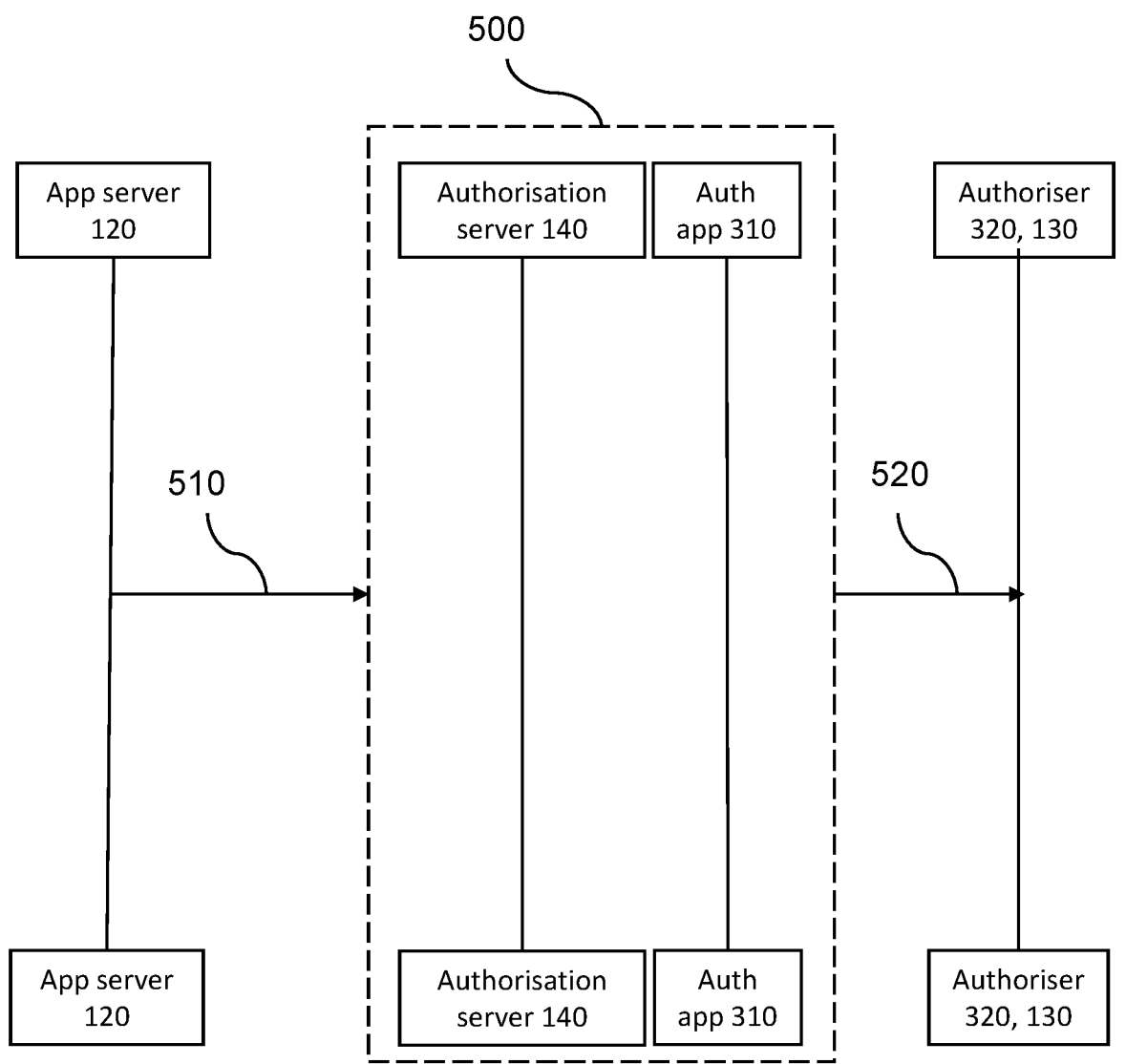
FIG. 5 shows a simplified flow process diagram of a method 400.

With reference to FIG. 5, there is shown a flow diagram corresponding to the method 400. The authorisation server 140 and the authorisation application 310 together act as a conversion service 500 between decoupled and redirect authorisation. By harnessing the conversion service 500, decoupled authorisation can be provided from the application server 120 even when the authoriser only supports redirect authorisation. The application server 120 transmits a decoupled authorisation request 510, such as according to CIBA, to the authorisation server 140 of the conversion service 500. Thus, irrespective of the authoriser, from the perspective of the application server 120, a CIBA flow is performed. The authorisation application 310 of the conversion service 500 transmits a redirect authorisation request 520 according to e.g. OAuth 2.0 to the authoriser through the second application 320 of the second device 150. Thus, from the perspective of the authoriser, a redirect authorisation flow is performed on the second device 150, and the authoriser does not need to recognise any decoupled authorisation protocol. Thus, the solution according to the present invention provides a flexible bridge between decoupled and redirect authorisation flows.

Figure 6:
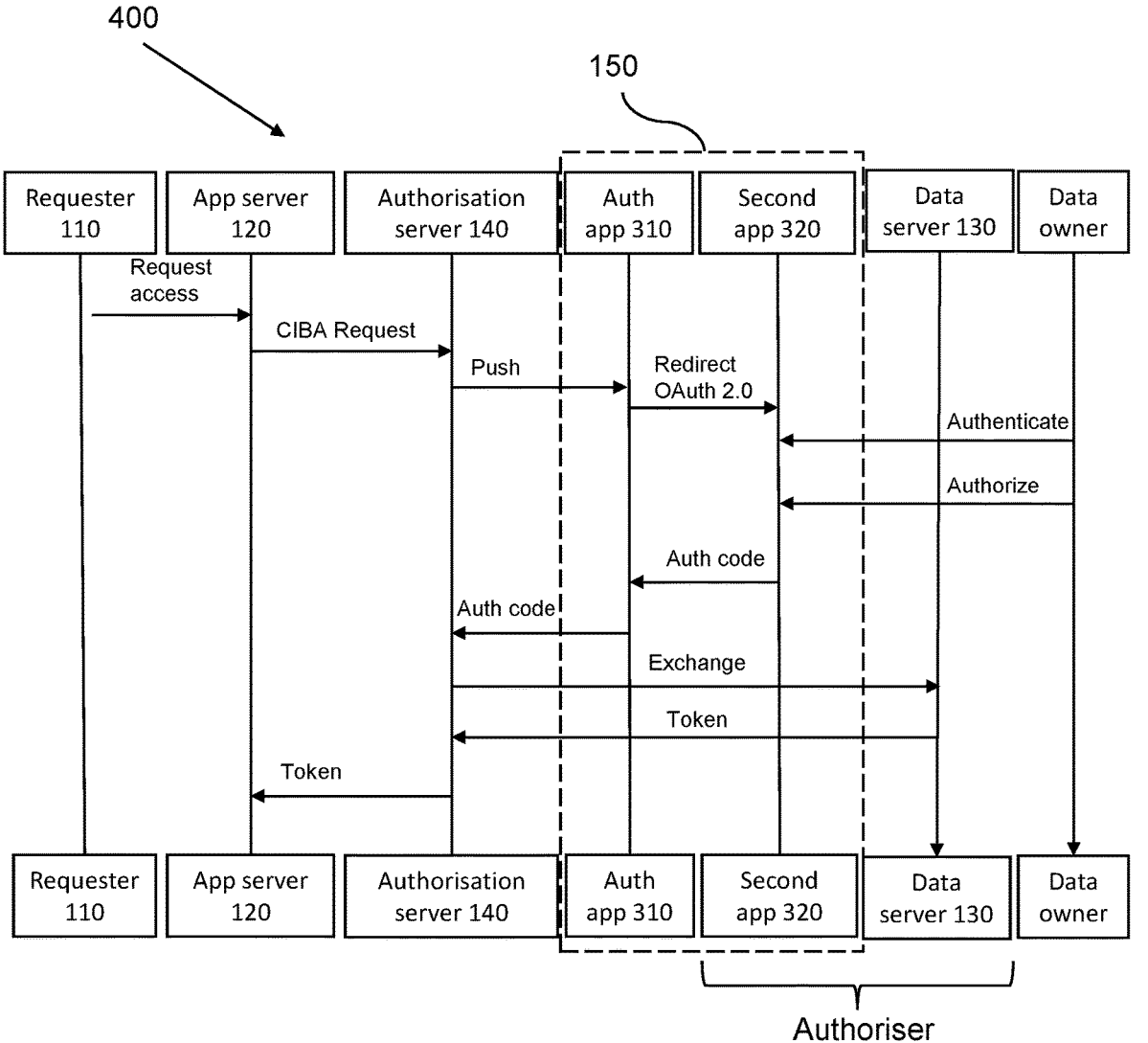
FIG. 6 shows a detailed flow process diagram of a method 400.

With reference to FIG. 6, there is shown a process flow diagram illustrating a method according to the disclosure, indicated by the reference numeral 400. The method 400 illustrated by the process flow diagram in FIG. 6 is an example of the method 400 shown in FIG. 4. The requester, i.e. client device 110, requests access to data 132 via the application server 120. The application server 120 transmits a decoupled authorisation request, e.g. a CIBA request, to the authorisation server 140 which pushes the request to the authorisation application 310 of the second device 150. The authorisation application 310 constructs a redirect authorisation request, e.g. according to OAuth 2.0, corresponding to the CIBA request and transmits the redirect authorisation request to the second application 320 associated with the authoriser. The data owner, i.e. user of the second device, is authenticated by the second application 320 and authorises the request on the second application 320. The second application 320 provides an authorisation code to the authorisation application 310, and the authorisation application 310 forwards the authorisation code to the authorisation server 140. The authorisation server 140 exchanges the authorisation code for an access token with the data server 130 and returns the access token to the application server 120. The application server 120 may then obtain the data 132 from the data server 130 and return the data 132 to the requester 110.

Figure 7:
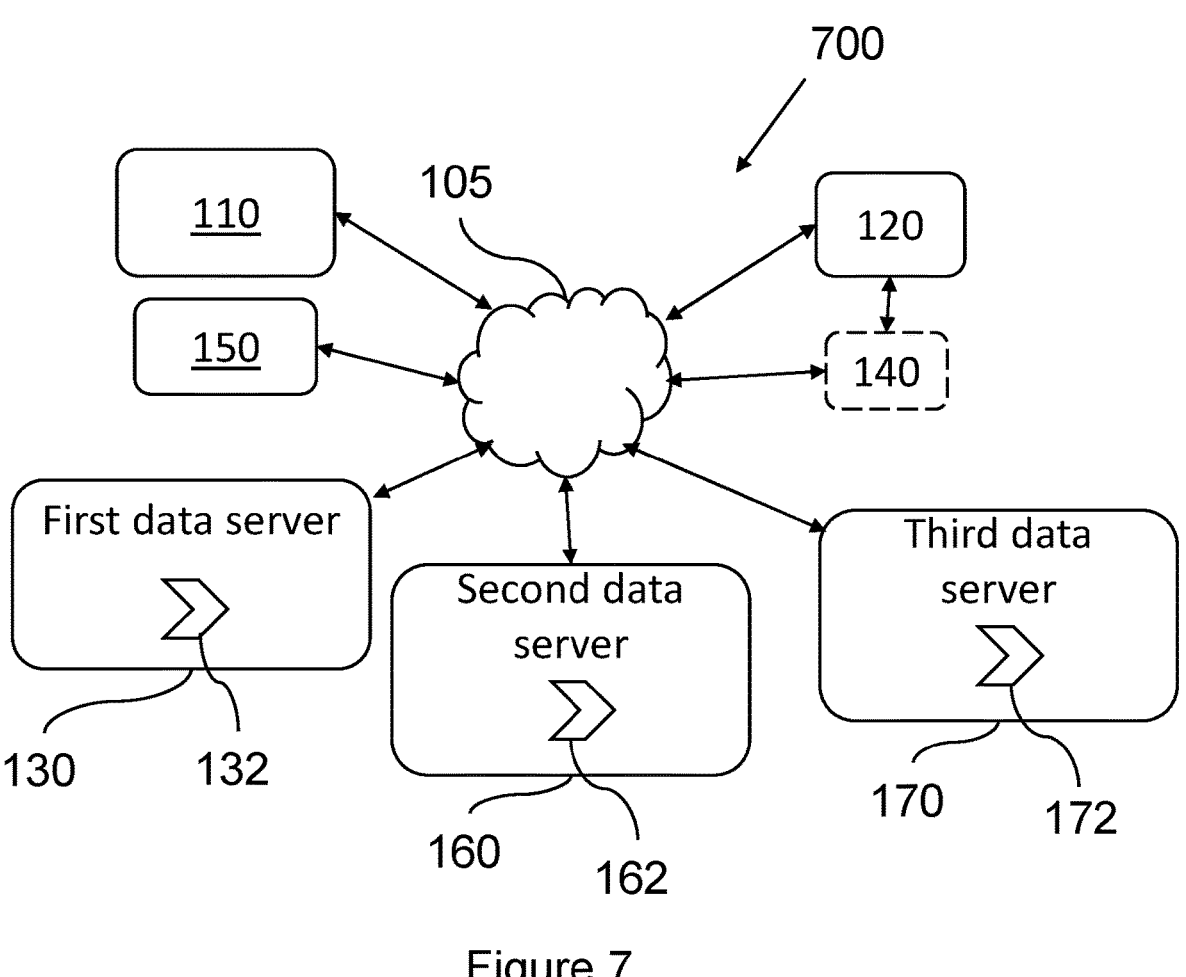
FIG. 7 shows a block diagram of a second system.

With reference to FIG. 7, there is shown a system 700. The system 700 is analogous to the system 100, except three data servers are associated with the system, a first data server 130 hosting first data 132, a second data server 160 hosting second data 162, and a third data server hosting third data 172. Each of the first data server 130, second data server 160 and third data server 170 are associated with different third party service providers, i.e. different authorisers, and each of the first to third data are associated with the same data owner. For example, the first to third data servers 130, 160, 170 may be each associated with a different service hosting sensitive data associated with the data owner. The data owner may wish to authorise all requests to access the data 132, 162, 172 on the second device 150. Thus, whenever a client device 110 requests access to any of the data 132, 162, 172 through the application server 120, an authorisation request is forwarded to the authorisation server 140 and pushed to the authorisation application 310 on the second device 150 as has been described.

Figure 8:
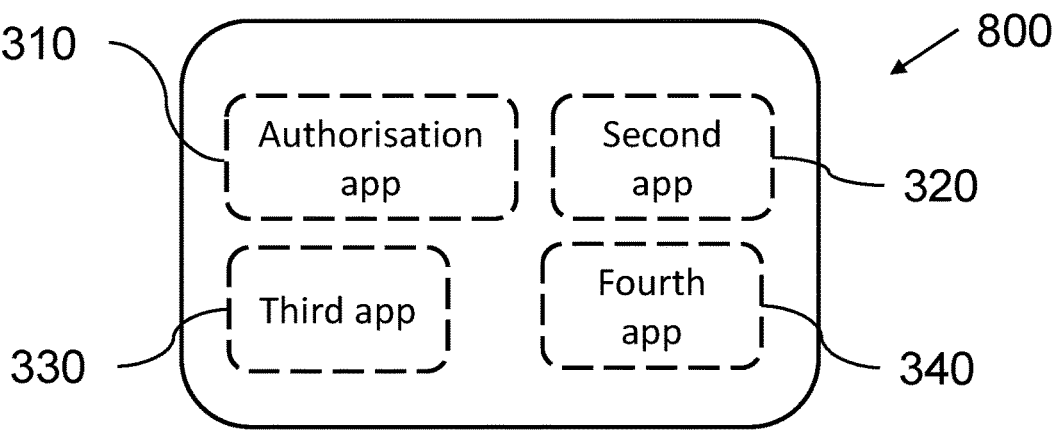
FIG. 8 shows a block diagram of a second computing device.

With reference to FIG. 8, the second device is arranged to execute a respective application associated with each authoriser. A second application 320 is associated with the first data server 130, a third application 330 is associated with the second data server 160 and a fourth application 340 is associated with the third data server 170. When the authorisation application receives the authorisation request, the authorisation application determines which third party service provider is the relevant authoriser for the requested data and transmits a redirect authorisation request to the relevant application. For example, if the request is for the second data 162, the authorisation application determines that the third application 330 is associated with the second data server 160 and transmits the redirect authorisation request to the third application 330.

Thus, according to the present invention the data owner can readily authorise all requests on the same device 150 irrespective of the origin of the request and irrespective of the capability of each authoriser to support a decoupled authorisation protocol.

The client device 110 described in the present disclosure may include a personal communication device such as a mobile phone, a table device or the like; a personal computing device such as a tablet Personal Computer (PC), desktop PC, a laptop computer, or the like; and/or other electronic devices such as a Portable Multimedia Player (PMP), a mobile medical device, a camera, or a wearable device such as a smart watch or smart glasses.

The term 'processor' is to be interpreted broadly to include a CPU, processing unit, ASIC, logic unit, or programmable gate array etc, and may refer to a single processor or a combination of several processors. Certain aspects of the disclosure may be implemented using machine-readable instructions which may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The functional modules may be implemented in a single processor or divided amongst several processors.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A computer-implemented method for authorising access to data associated with a user, comprising:
   receiving, at an application server from a first device, a request to access the data associated with the user, the data being hosted at a data server;
   providing, by the application server, an authorisation request to an authorisation server;
   transmitting the authorisation request from the authorisation server to an authorisation application executed on a second device associated with the user; and
   sending, by the authorisation application executed on the second device in response to receiving the authorisation request, a redirect authorisation request to a second application executed on the second device, the second application being associated with the data server;
   authorising, at the second device by the second application, the request in dependence on an authorisation input from the user at the second device; and
   in response to the authorisation of the request, providing, by the second application, an access token to the application server via the authorisation server, the access token being configured to enable access by the application server to the data associated with the user.

2. The method of claim 1, wherein the method comprises:
   displaying, at a display of the second device through the authorisation application, information indicative of the data requested;
   receiving, at the second device, a user input; and
   sending the redirect authorisation request in dependence on the user input.

3. The method of claim 2,
   wherein the user input is indicative of a selection of a subset of the data requested; and
   sending the redirect authorisation request comprises selectively requesting the subset of data selected.

4. The method of claim 1, wherein the access token is provided by the second application to the authorisation server via the authorisation application.

5. The method of claim 1, wherein providing the access token comprises:
   providing, by the second application, an authorisation code to the authorisation server via the authorisation application; and
   retrieving, by the authorisation server, the access token from the data server using the authorisation code.

6. The method of claim 1, further comprising authenticating, at the second device by the second application, the user of the second device, and wherein the authorising is further in response to successful authentication of the user.

7. The method of claim 6, wherein authenticating the user comprises:
   obtaining user data associated with the user at the second device,
   comparing the user data to predetermined authentication data, and
   authenticating the user in dependence on the comparison.

8. The method of claim 7, wherein the user data comprises an indication of one or more biometric measurements taken of the user through the second device.

9. The method of claim 8, wherein the user data comprises one or more of:
   fingerprint data received from a fingerprint sensor associated with the second device, image data of the user received from an image sensor associated with the second device, or voice data of the user received from an audio sensor associated with the second device.

10. The method of claim 1, wherein the second device is a mobile device.

11. A system for authorising access to data associated with a user and hosted at a data server, the system comprising:
   an application server configured to receive, from a first device, a request to access the data associated with the user and transmit an authorisation request associated with the request to an authorisation server;
   the authorisation server configured to receive the authorisation request from the application server; and
   a second device associated with the user configured to execute an authorisation application and a second application associated with the data server;
   wherein the authorisation server is configured to:
      transmit the authorisation request to the authorisation application executed on the second device; and
   wherein the second device is configured to:
      send, by the authorisation application in response to receiving the authorisation request, a redirect authorisation request to the second application;

authorise, by the second application, the request in dependence on an authorisation input from the user at the second device; and in response to the authorisation, provide, by the second application, an access token to the application server via the authorisation server, the access token being configured to enable access by the application server to the data associated with the user.

12. A computing device for authorising access to data associated with a user and hosted at a data server, the device comprising:

one or more processors; and a memory storing computer executable instructions therein which, when executed by the one or more processors, cause the one or more processors to:

execute an authorisation application;

execute a second application associated with a data server hosting the data associated with the user;

receive, through the authorisation application, an authorisation request from an authorisation server, wherein the authorisation request is indicative of a request by an application server to access the data associated with the user;

send, by the authorisation application in response to receiving the authorisation request, a redirect authorisation request to the second application;

authorise, by the second application, the request in dependence on an authorisation input from the user; and in response to the authorisation, transmit, by the second application, an access token to the application server via the authorisation server, the access token being configured to enable access by the application server to the data associated with the user.

13. A computer-readable data storage medium storing computer-readable instructions which, when executed by one or more processors, perform a method of:

receiving, at an application server from a first device, a request to access data associated with the user, the data being hosted at a data server;

providing, by the application server, an authorisation request to an authorisation server;

transmitting the authorisation request from the authorisation server to an authorisation application executed on a second device associated with the user; and sending, by the authorisation application executed on the second device in response to receiving the authorisation request, a redirect authorisation request to a second application executed on the second device, the second application being associated with the data server;

authorising, at the second device by the second application, the request in dependence on an authorisation input from the user at the second device; and in response to the authorisation of the request, providing, by the second application, an access token to the application server via the authorisation server, the access token being configured to enable access by the application server to the data associated with the user.

* * * * *